United States Patent
Esquivias et al.

(10) Patent No.: US 11,799,420 B1
(45) Date of Patent: Oct. 24, 2023

(54) SOLAR ARRAY REVERSE CURRENT PROTECTION

(71) Applicant: Maxar Space LLC, Palo Alto, CA (US)

(72) Inventors: Jason Esquivias, Aurora, CO (US); Jeffrey David McCallum, East Palo Alto, CA (US)

(73) Assignee: Maxar Space LLC, Palo Alto, CA (US)

( * ) Notice: Subject to any disclaimer, the term of this patent is extended or adjusted under 35 U.S.C. 154(b) by 0 days.

(21) Appl. No.: 17/748,970

(22) Filed: May 19, 2022

Related U.S. Application Data

(60) Provisional application No. 63/341,356, filed on May 12, 2022.

(51) Int. Cl.
  *H02S 50/00* (2014.01)
  *H02J 3/38* (2006.01)
  *B64G 1/44* (2006.01)
  *H02S 10/40* (2014.01)

(52) U.S. Cl.
  CPC .............. *H02S 50/00* (2013.01); *B64G 1/443* (2013.01); *H02J 3/381* (2013.01); *H02S 10/40* (2014.12); *H02J 2300/24* (2020.01)

(58) Field of Classification Search
  CPC ......... H02S 50/00; H02S 10/40; B64G 1/443; H02J 3/381; H02J 2300/24

USPC ......................................................... 307/9.1
See application file for complete search history.

(56) References Cited

U.S. PATENT DOCUMENTS

| | | | |
|---|---|---|---|
| 6,218,606 | B1 | 4/2001 | Morizane et al. |
| 8,212,138 | B2 | 7/2012 | Landis |
| 9,087,948 | B1 | 7/2015 | Frolov et al. |
| 11,018,623 | B2 | 5/2021 | Loewenstern et al. |
| 2012/0139347 | A1* | 6/2012 | Hackenberg ............ H02M 7/42 307/71 |
| 2016/0005910 | A1 | 1/2016 | Sater |
| 2019/0363200 | A1* | 11/2019 | Höft ........................ H02S 50/10 |

* cited by examiner

*Primary Examiner* — Hal Kaplan
(74) *Attorney, Agent, or Firm* — Vierra Magen Marcus LLP

(57) ABSTRACT

Technology is disclosed herein for reverse current protection for a photovoltaic module string. An apparatus has a switch connected between each respective PV module string and a power bus. A control circuit closes a set of the switches to connect a set of the PV module strings to the power bus to transfer power from the set of the photovoltaic PV module strings to the power bus. The control circuit determines whether a reverse current flows in the direction from the power bus to any of the PV module strings. The control circuit maintains the switch associated with a particular PV module string in an open state to prevent reverse current from flowing in the particular PV module string responsive to a determination that a reverse current flows in the particular PV module string when the particular PV module string is connected to the power bus.

23 Claims, 11 Drawing Sheets

SOLAR ARRAY REVERSE CURRENT PROTECTION

PRIORITY DATA

The present application claims priority to U.S. Provisional Patent Application No. 63/341,356, filed on May 12, 2022, entitled "SOLAR ARRAY REVERSE CURRENT PROTECTION", which application is incorporated by reference herein in its entirety.

BACKGROUND

A solar array contains a large number of photovoltaic (PV) cells. Each PV cell may also be referred to as a solar cell. The PV cell is an electrical device that converts light into electricity by the photovoltaic effect. Each PV cell may contain one or more semiconductor diodes (i.e., one or more pn junctions). Thus, each PV cell may be a single junction semiconductor device or a multi junction semiconductor device. An example is a III-V semiconductor multi junction device, where each junction has a different band gap energy to enable absorption of electromagnetic radiation over a different range of wavelengths. Other types of materials may be used in the PV cell.

Connecting a number of PV cells in series allows for a greater voltage to be provided by the solar array. Herein, a string of series connected PV cells will be referred to as a PV cell string. Connecting a number of PV cell strings in parallel allows for a greater current to be provided by the solar array. It is common for PV cells to be packaged in a PV module that contains a number of PV cells. Each PV module typically contains at least one PV cell string. Multiple PV cell strings can be connected in parallel within the PV module to increase the current output of the PV module.

FIG. 1 is a diagram of a conventional solar circuit. The solar circuit has a number of PV modules 2 that are connected together. Each PV module 2 has two terminals in this example. The positive (+) and negative (−) terminals of the PV module 2 in the upper left of the diagram are labeled to indicate the voltage when the PV module 2 is generating power. The PV module 2 may be viewed as a fundamental building block of a solar array. A number of PV modules 2 are connected in series to form a PV module string 8. FIG. 1 depicts PV module strings 8-1, 8-2, . . . 8-m connected in parallel. The PV module strings 8-1, 8-2, . . . 8-m are connected together at a negative end 10. The PV module strings 8-1, 8-2, . . . 8-m are connected together at a positive end 12. Thus, the currents from the PV module strings 8-1, 8-2, . . . 8-m will sum together. The positive end 12 and negative end 10 may be placed across a load to provide power. One option is for the load to include a battery, wherein the solar circuit may be used to charge the battery. Multiple solar circuits can be connected together to form a solar array. For example, multiple solar circuits can be connected in parallel in order to increase the current output. As another example, multiple solar circuits can be connected in series in order to increase the voltage output.

Each PV module string 8 may also have a number of protection diodes. One type of protection diode protects against reverse current in a respective PV module string 8. Such a diode is typically referred to as a blocking diode. A blocking diode 6 is depicted on each PV module string 8. Such a blocking diode 6 will protect against current flowing from the positive end 12 to the negative end 10 of a particular PV module string 8, which is referred to herein as a reverse current. A reverse current could potentially flow in a PV module string 8 if the PV module string 8 is underperforming or faulty. For example, if some or all of the PV modules 2 of the PV module string 8 are presently shaded (i.e., not in direct sunlight) the shaded PV modules 2 will not generate a significant voltage. If the solar circuit is connected to a battery at a higher voltage than the PV module string, the battery voltage can cause a reverse current to flow through the lower voltage PV module string. Therefore, the battery would discharge. However, the blocking diode 6 will block this reverse current flow.

Another type of protection diode provides an alternative path for forward current to bypass a PV module 2 that is not presently generating current (or is generating a lower current than the current of the PV module string). Such a diode is sometimes referred to as a bypass diode. FIG. 1 depicts a number of bypass diodes 4. A bypass diode 4 may be placed in parallel with each PV module 2, which allows current flowing in the PV module string 8 from the negative end 10 to the positive end 12 to bypass a PV module 2. A bypass diode 4 is used to bypass an underperforming or faulty PV module 2. An example of an underperforming PV module is one that is presently shaded (i.e., not in direct sunlight). PV modules 2 in a PV module string 8 that are exposed to sunlight will generate a current. However, if one of the PV modules 2 in the string 8 is not exposed to sufficient sunlight it will not generate significant current. The bypass diode 4 will allow current to bypass such as "shaded" PV module 2. Although the bypass diodes 4 are depicted outside of the respective PV modules 2, the bypass diodes 4 may be integrated within the respective PV module 2.

BRIEF DESCRIPTION OF THE DRAWINGS

Aspects of the present disclosure are illustrated by way of example and are not limited by the accompanying figures for which like references indicate the same or similar elements.

DETAILED DESCRIPTION

Technology is disclosed herein for an apparatus and method for providing reverse current protection for a PV module string. In an embodiment, a power control and distribution unit (PCDU) contains a number of switches, with each switch connected between a respective PV module string and a main power bus. Each switch has a closed state to electrically connect the respective PV module string to the main power bus to provide a forward current from the respective PV module string to the main power bus. Each switch has an open state to create an open circuit between the respective PV string and the main power bus. A control circuit closes a set of the switches to connect a set of the PV module strings to the main power bus to directly transfer power from the set of the photovoltaic PV module strings to the main power bus. The control circuit determines whether a reverse current flows in the direction from the main power bus to any of the PV module strings. The control circuit maintains the switch associated with a particular PV module string in the open state to prevent reverse current from flowing in the particular PV module string responsive to a determination that a reverse current flows in the particular PV module string when the particular PV module string is connected to the main power bus. In some embodiments, the switches are implemented with two-quadrant transistor based switches. A two-quadrant transistor based switch contains one or more transistors. A transistor based switch that operates in two-quadrants may block the flow of current in both a forward and a reverse direction when in an open (also referred to as off) state. In one embodiment, the two-quadrant transistor based switch contains two MOSFETs in series. The MOSFETs may have their respective internal body diodes pointing in opposite directions In one embodiment, the two-quadrant transistor based switch contains a bipolar junction transistor (BJT).

Therefore, there is no need for a blocking diode to prevent reverse current flow in a PV module string. If a blocking diode were to be used, then a diode voltage (e.g., 0.7V) appears across the blocking diode during normal operation when a forward current is provided. Moreover, there will be some power dissipation across the blocking diodes, which reduces power efficiency. In a low voltage bus architecture, the dissipation across the blocking diodes can be around 5% of the total solar array power. Even for higher voltage bus architectures considerable power is saved by avoiding the use of blocking diodes. Note that in some embodiments, the switches are also used for the direct energy transfer from the PV module strings to the main power bus. Therefore, the switches can serve a dual purpose.

Figure 2:
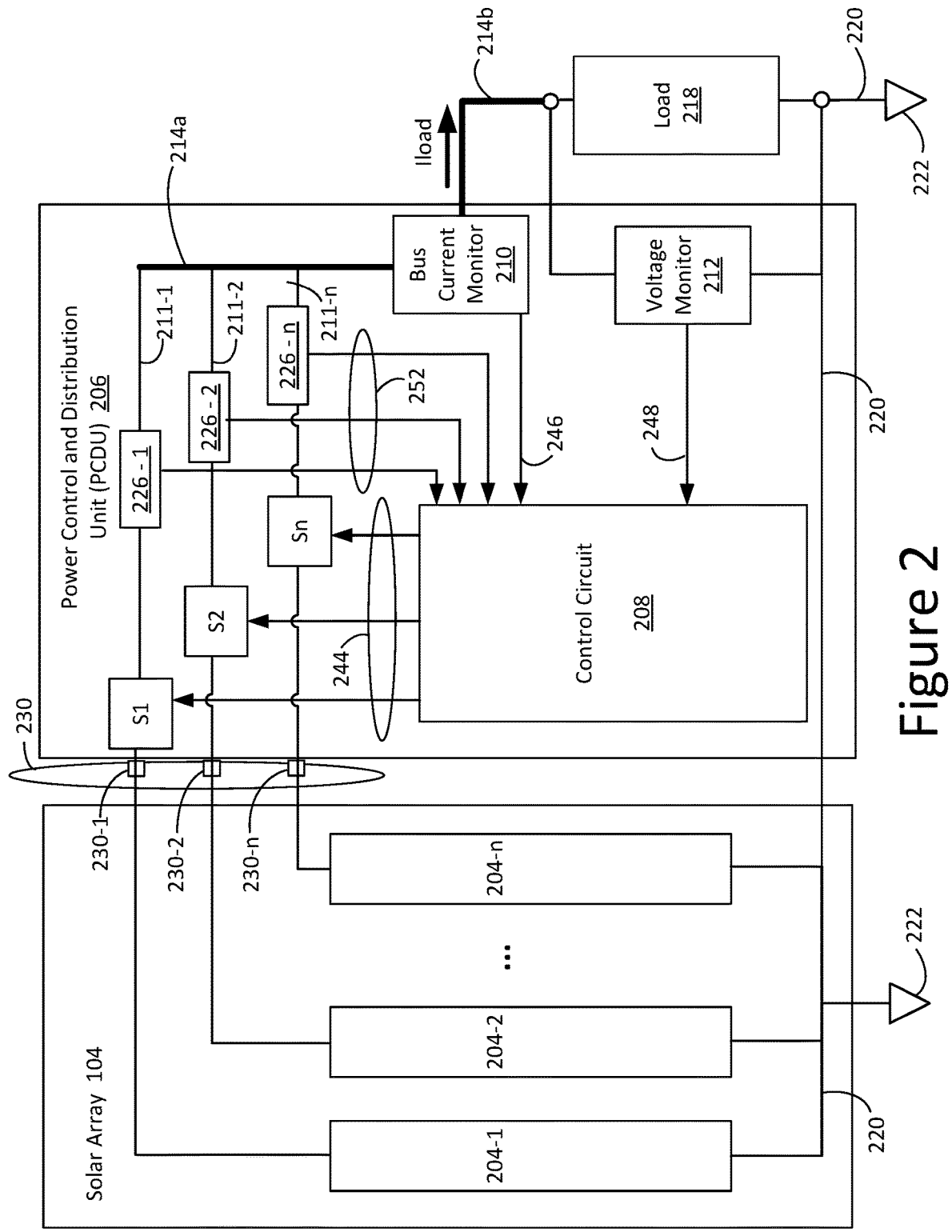
FIG. 2 is a diagram of one embodiment of an electronic power system (EPS) of a spacecraft.

FIG. 2 is a diagram of one embodiment of an electronic power system (EPS). The EPS includes a solar array 104 and a Power Control and Distribution Unit (PCDU) 206. The PCDU is sometimes referred to as a Power Conditioning and Distribution Unit. The PCDU 206 transfers power from the solar array 104 to the load 218. The load 218 could include a battery. In one embodiment the PCDU 206 is also responsible for charging the battery. The battery is configured to store the power from the solar array 104 and supply the power to the load when the solar power is not sufficient to meet power requirements. The solar array 104 has a number of PV module strings 204-1, 204-2, . . . 204-n. Each PV module strings 204 is able to generate power and/or current independent of the other PV module strings 204.

The PCDU 206 provides power, voltage, and/or current to a main power bus. The main power bus has a positive line 214 and a negative (or return) line 220. The return line 220 is connected to ground 222. The positive line 214 has two different sections 214a, 214b, referenced in FIG. 2. The reference numeral 214 may be used herein to refer to the positive line 214 in general. A portion of the positive line 214a is internal to the PCDU 206. A portion of the positive line 214b provides a load current (Iload) to the load 218. The load 218 is connected between the positive line 214b and the return line 220 of the main power bus. The main power bus provides power, voltage, and/or current (Iload) to the load 218. Note that a battery may also be connected between the positive line 214b and the return line 220 of the main power bus. The voltage across the main power bus refers to the voltage between the positive line 214 and the return line 220 (or ground). In this manner, the battery voltage serves to regulate the voltage on the main power bus.

The PCDU 206 has a control circuit 208, a voltage monitor 212, a portion of the main power bus 214a, switches S1, S2, . . . Sn, as well as one or more current monitors (210, 226). The switches S1, S2, . . . Sn are connected between the PV module strings 204 and the positive line 214a of the main power bus. There is one switch for each PV module string 204. Each switch is connected between one of the PV module strings 204 and the positive line 214 of the main power bus. Alternatively, the switches S1, S2, . . . Sn could be located between the PV module strings 204 and the return line 220 of the main power bus. Each switch has an open state and a closed state. In the closed state the switch will electrically connect its associated PV module string 204 to the main power bus. That is, when the switch is closed, the associated PV module string 204 will be electrically connected between the positive line 214 and the negative line 220 of the main power bus. In the open state the switch will disconnect its associated PV module string 204 from the main power bus. In other words, the open switch will create an open circuit between the PV module string 204 and either the positive line 214 or return line 220. In one embodiment, each switch S1-Sn has (or is) a two-quadrant transistor based switch. In one embodiment, the two-quadrant transistor based switch contains two MOSFETs in series. In an embodiment, the two MOSFETs have their respective internal body diodes pointing in opposite directions. In one embodiment, the two-quadrant transistor based switch contains a bipolar junction transistor (BJT). In one embodiment, each switch S1-Sn has (or is) a relay that can be opened or closed. The control circuit 208 is configured to control the switches S1. Sn by issuing a control signal to each respective switch S1-Sn.

In an embodiment, the control circuit 208 is configured to control the switches Si-Sn to connect a first set of the PV module strings 204 in parallel to the main power bus and disconnect a second set of the PV module strings 204 from the main power bus in order to provide power, voltage, and/or a load current to the load 218. The control circuit 208 could also provide a charging current to a battery, which may be in parallel with the load 218 or may be considered to be part of the load 218. In an embodiment, the control circuit 208 sends control signals over a set of control lines 244 between the control circuit 208 and the switches S1-Sn. The control signals may be digital or analog signals. In an embodiment, the control circuit 208 has drivers that provide analog voltages to the respective switches to control the state of the switches.

In an embodiment, the first set of the PV module strings 204 are directly connected to the main power bus. For example, the respective switches associated with first set of the PV module strings 204 are closed to directly connect the first set of the PV module strings 204 to the positive line 214 of the main power bus. The respective switches associated with second set of the PV module strings 204 are open such that the second set of the PV module strings 204 are disconnected from the main power bus. Thus, there is an open circuit between a PV nodule string 204 in the second set and the main power bus. Thus, the control circuit 208 issues the one or more control signals to control how much current is provided from the PV module strings 204 to the main power bus. The control circuit 208 may also issue the one or more control signals to regulate the voltage on the main power bus.

In an embodiment, the PCDU 206 includes one or more interface cards. An interface card has one or more interfaces. The PCDU 206 has a PV module string interface 230. The PV module string interface 230 has a number of PV module string inputs 230-1, 230-2, . . . 230-n with each PV module string input configured to receive a current from a different PV module string 204. Each PV module string input 230 provides a physical and electrical connection to one of the PV module strings 204. For example, input 230-1 is configured to receive a current from PV module string 204-1, input 230-2 is configured to receive a current from PV module string 204-2, and input 230-n is configured to receive a current from PV module string 204-n.

The PCDU 206 also has one or more current monitors. In FIG. 2, there are a number of PV module string current monitors 226-1, 226-2, . . . 226-n. Each PV module string current monitor 226 monitors the current of one of the PV module strings 204-1, assuming that the PV module string 204 is currently connected to the positive line 214a of the main power bus. Each PV module string current monitor 226 sends a signal to the control circuit 208 that is indicative of the current of the respective PV module string 204. The signal may indicate the magnitude and/or direction of the current. In one embodiment, whenever a PV module string current monitor 226 detects a reverse current (i.e. a current flowing from the main power bus 214a to the PV module string 204) the PV module string current monitor 226 will alert the control circuit 208. In an embodiment, the control circuit 208 will determine whether a reverse current flows in a particular PV module string 204 based on the signal from the associated PV module string current monitor 226. The PV module string current monitors 226 may be placed in a different location than depicted in FIG. 2. Another possible location for a PV module string current monitor 226 is between a switch (e.g., S1) and the PV module string input (e.g., 230-1).

The bus current monitor 210 monitors the main bus current, which in the example in FIG. 2 is Iload. The bus current monitor 210 sends a signal to the control circuit 208 that is indicative of the magnitude of the current on the main power bus. The signal is sent over signal line 246. The signal may be a digital or analog signal. In an embodiment, the control circuit 208 will determine whether a reverse current flows in a particular PV module string 204 based on the magnitude of the current on the main power bus. Briefly, the control circuit 208 may close one of the switches to connect a PV module string 204 to the main power bus. If the current on the main power bus decreases in response to connecting the PV module string 204 to the main power bus this may indicate that a reverse current flows in the PV module string 204. As another example, the control circuit 208 may open one of the switches to disconnect a PV module string 204 from the main power bus. If the current on the main power bus increases in response to disconnecting the PV module string 204 from the main power bus this may indicate that a reverse current was flowing in the PV module string 204.

It is not required to use both the bus current monitor 210 and the PV module string current monitors 226 in order to determine whether a reverse current flows in a particular PV module string 204. In one embodiment, the PV module string current monitors 226 are used but the bus current monitor 210 is not used to detect reverse current flow. In one embodiment, the bus current monitor 210 are used but the PV module string current monitors 226 are not used to detect reverse current flow.

In an embodiment, the control circuit 208 will open the switch associated with the PV module string 204 having the reverse current flow to disconnect the PV module string 204 from the main power bus. Therefore, reverse current flow in the PV module string 204 is prevented. Moreover, there is no need for a blocking diode to prevent the reverse current in the PV module string 204. Therefore, the EPS has efficient power transfer.

The voltage monitor 212 monitors the voltage of the main power bus. The voltage monitor 212 sends a signal to the control circuit 208 that is indicative of a magnitude of the main bus voltage. The voltage monitor 212 sends the signal over a signal line 248. The signal may be a digital or analog signal.

As noted, each switch S1-Sn may include a two-quadrant transistor based switch. In one embodiment, each two-quadrant transistor based switch has two transistors (e.g., MOSFETs) in series. One of the MOSFETs may be controlled (i.e., turned on/off) for general power regulation. The other MOSFET may be controlled to provide reverse current protection as described herein. In an embodiment, the two MOSFETs have their respective internal body diodes pointing in opposite directions. The reverse current protection MOSFET may be normally on, with the power regulation MOS-FET turned on/off for power regulation. The reverse current protection MOSFET may turned off to prevent the reverse current flow. However, rather than using two MOS-FETs per switch, a single Rif can be used for both power regulation and reverse current protection.

The control circuit 208 may be implemented in hardware, software, or a combination of hardware and software. In one embodiment, the control circuit 208 includes a microcontroller that is programmable and reprogrammable. In one embodiment, the control circuit 208 includes one or more analog error amplifiers. One or more of the control circuit 208, bus current monitor 210, PV module string current monitors 226, and/or voltage monitor 212 may be referred to herein as one or more control circuits.

Figure 3:
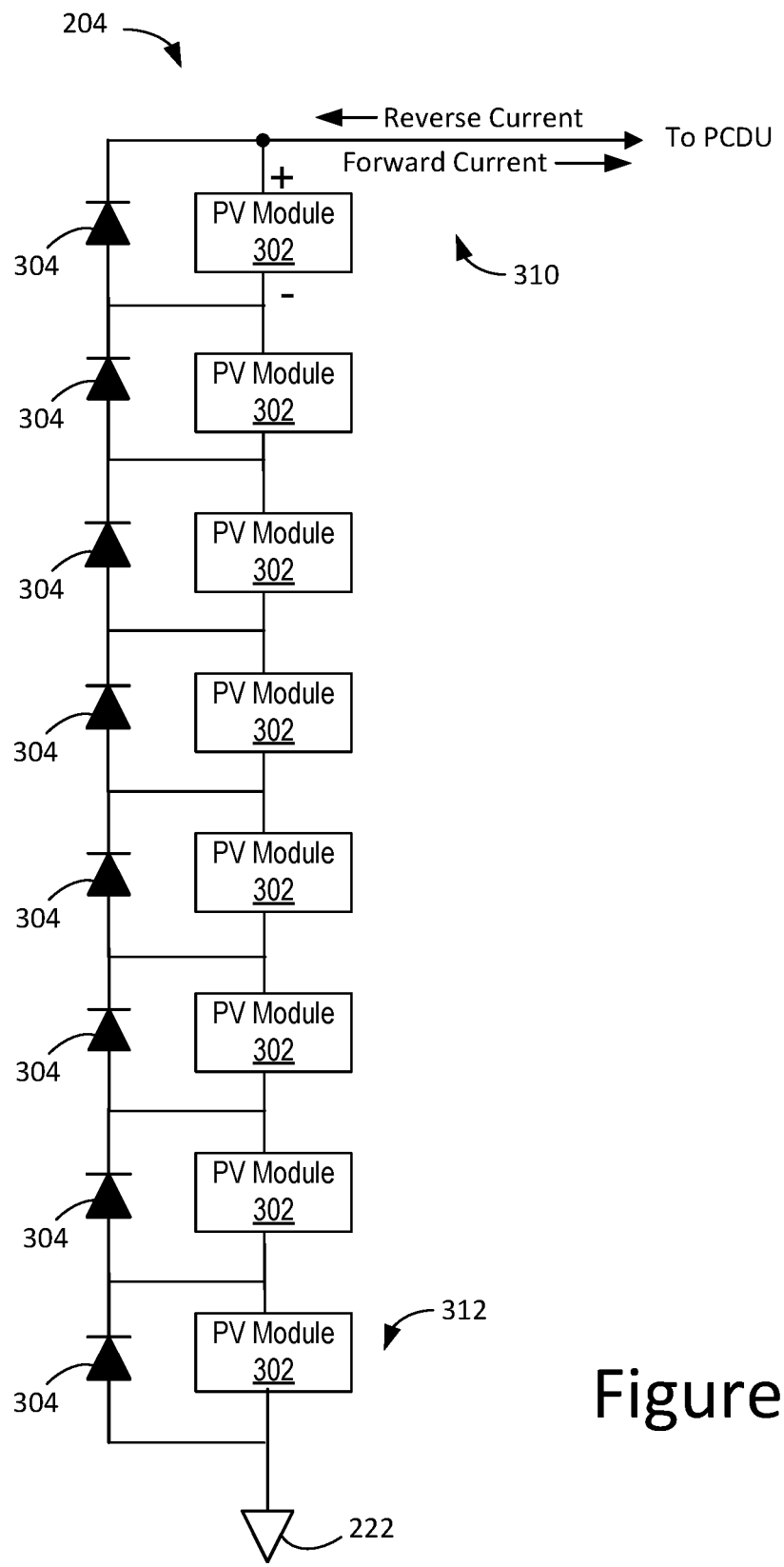
FIG. 3 is a diagram of one embodiment of a PV module string.

FIG. 3 is a diagram of one embodiment of a PV module string 204. The PV module string 204 is one embodiment of one of the PV module strings 204 in the solar array 104 in FIG. 2. The PV module string 204 has a number of PV modules 302 that are connected in series. Each PV module 2 has two terminals in this example. The positive (+) and negative (−) terminals of the uppermost PV module 302 are labeled to indicate the voltage when the PV module 302 is generating power. The positive end 310 of the PV module string 204 may be connected to the PCDU 206. The negative end 312 of the PV module string 204 may be connected to ground 222 (or the return line of the main power bus). The direction of a Forward Current and the direction of a Reverse Current are indicated in FIG. 3.

Each PV module 302 contains at least one PV cell and typically contains a number of PV cells. Each PV cell may also be referred to as a solar cell. The PV cell is an electrical device that converts light into electricity by the photovoltaic effect. Each PV cell may contain one or more semiconductor diodes (i.e., one or more pn junctions). Thus, each PV cell may be a single junction semiconductor device or a multi junction semiconductor device. An example is a III-V semiconductor multi junction device, where each junction has a different band gap energy to enable absorption of electromagnetic radiation over a different range of wavelengths. Other types of materials may be used in the PV cell. Each PV module 302 typically contains at least one PV cell string. Multiple PV cell strings can be connected in parallel within the PV module 302 to increase the current output of the PV module 302.

FIG. 3 depicts a number of bypass diodes 304. A bypass diode 304 may be placed in parallel with each PV module 302, which allows a forward current to bypass a PV module 302. Although the bypass diodes 304 are depicted outside of the respective PV modules 302, the bypass diodes 304 may be integrated within the respective PV module 302. The bypass diodes 304 are not a requirement, as other techniques may be used to deal with forward current flow in connection with underperforming PV modules 302.

Figure 1:
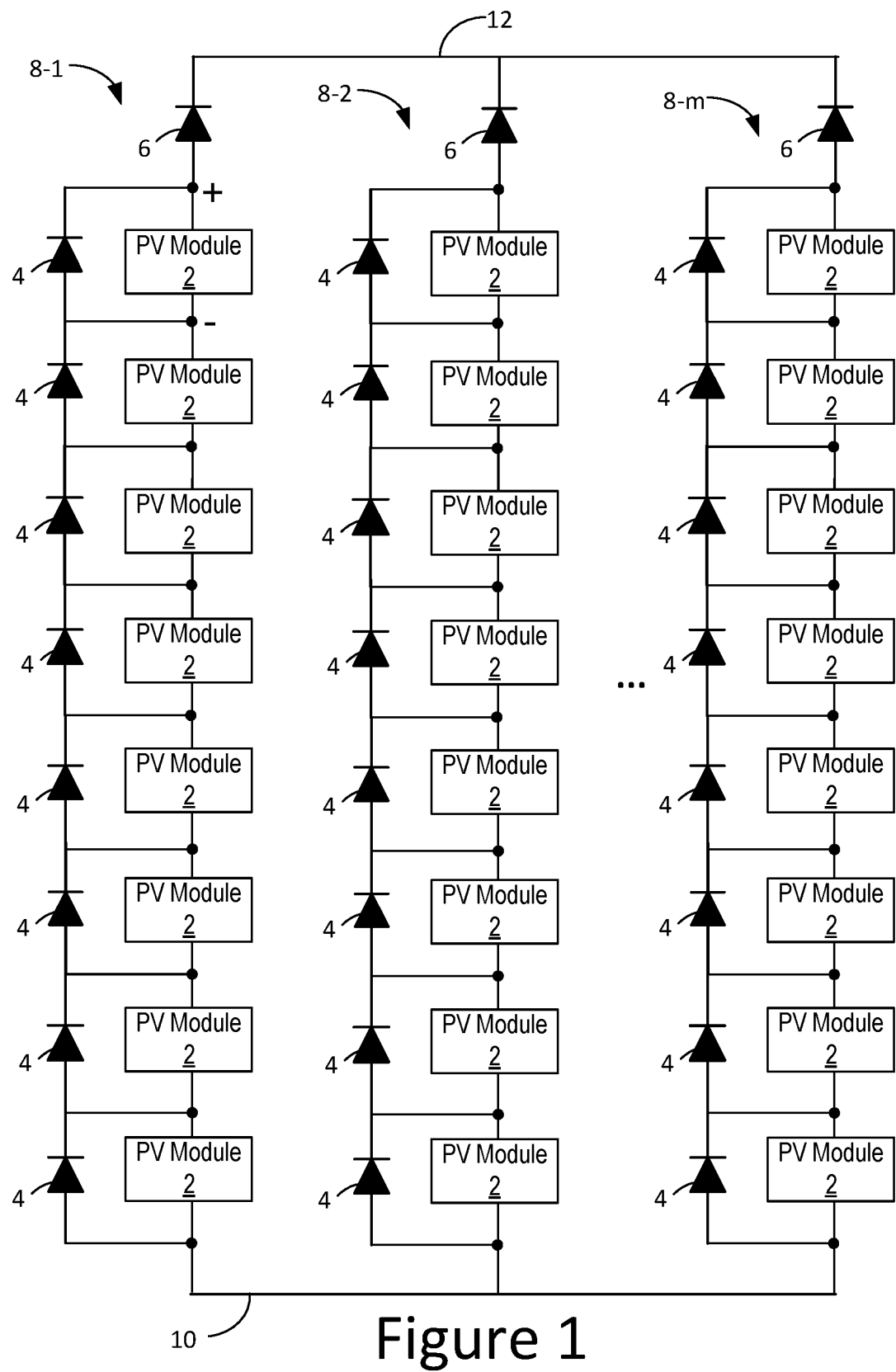
FIG. 1 is a diagram of a conventional solar circuit.

Note that unlike the conventional PV module strings 8 in FIG. 1, which each have a blocking diode 6, there is not a blocking diode to prevent a reverse current flow in the PV module string 204 in the embodiment depicted in FIG. 3. As discussed above, the PCDU 206 is able to determine that a reverse current flows in a particular PV module string 204 and disconnect the particular PV module string 204 from the main power bus to prevent any reverse current in the particular PV module string 204. Because the PV module string 204 in FIG. 3 does not have a blocking diode in series with the PV module string 204, the power generation system is more efficient than a conventional power generation system that uses a blocking diode such as in FIG. 1.

Figure 4:
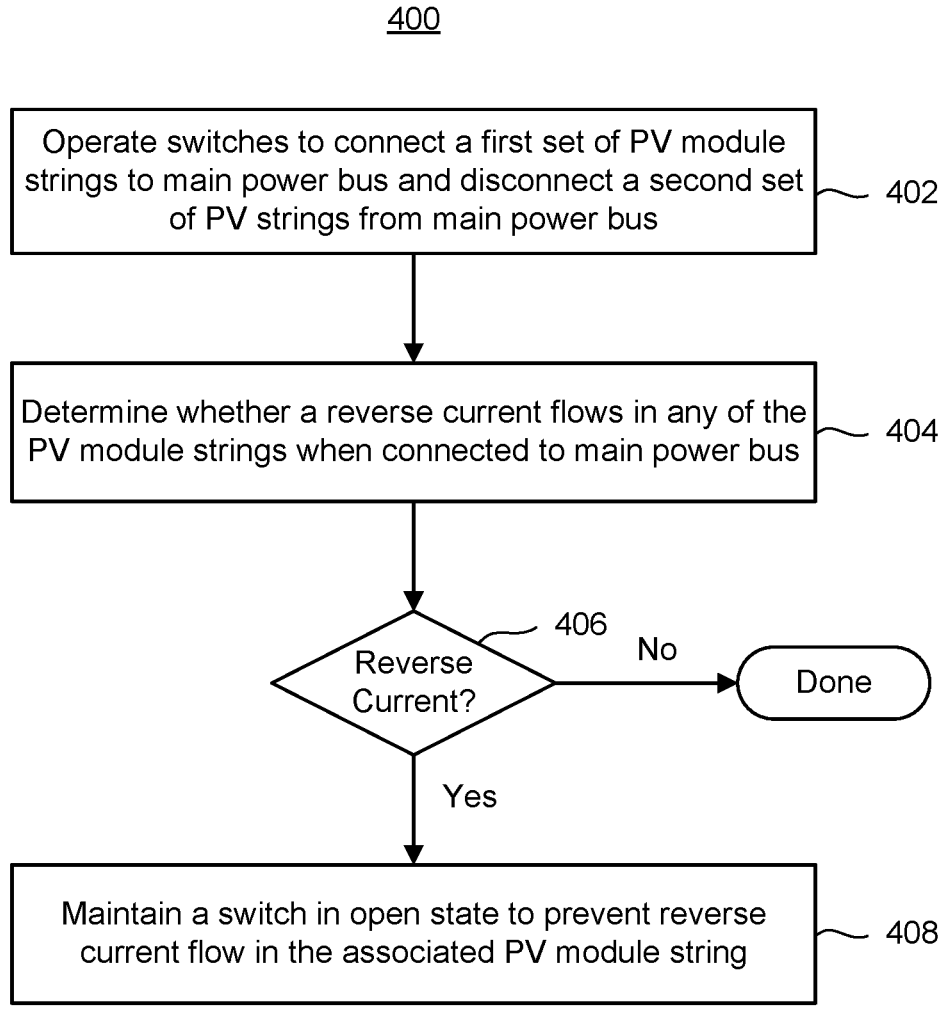
FIG. 4 is a flowchart of one embodiment of a process of preventing reverse current in a PV module string.

FIG. 4 is a flowchart of one embodiment of a process 400 of preventing reverse current in a PV module string. In one embodiment, the process is controlled by control circuit 208 in the PCDU 206. Step 402 includes the control circuit 208 in the PCDU 206 operating switches S1-Sn to connect a first set of PV module strings 204 in the solar array 104 to a main power bus and disconnect a second set of PV module strings 204 in the solar array from the main power bus. Each PV module string 204 has a number of PV modules 302 connected in series. Each PV module 302 has at least one string of PV cells connected in series.

Figure 5:
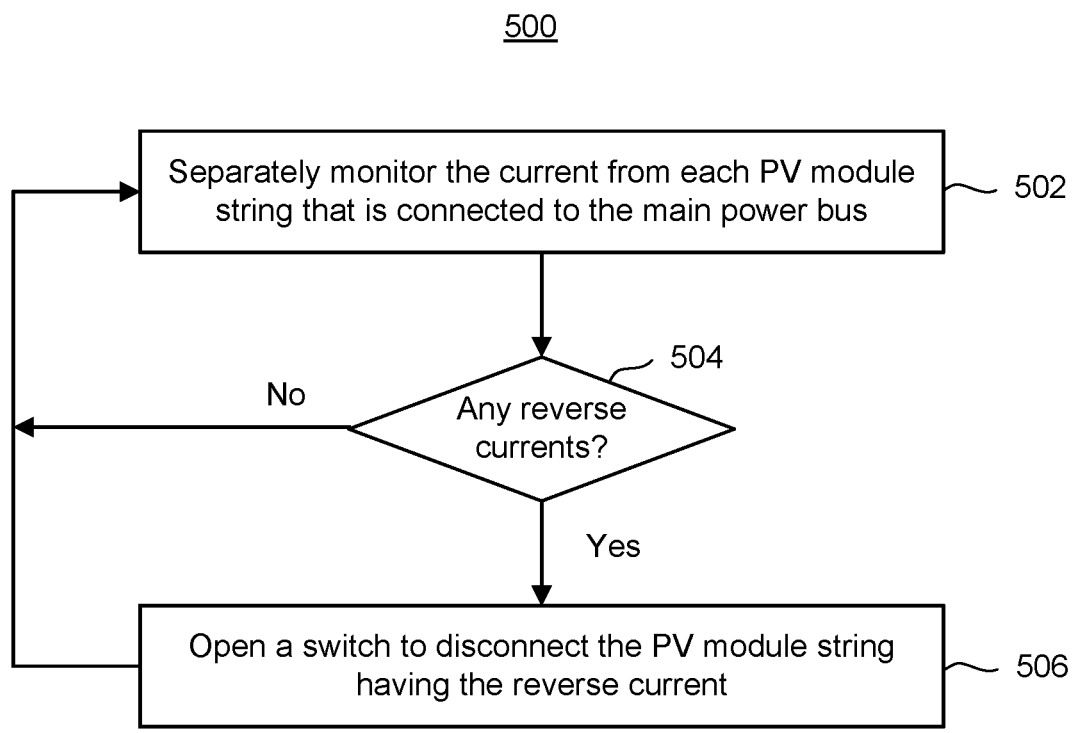
FIG. 5 is a flowchart of one embodiment of a process of detecting reverse current in a PV module string using PV module string current monitors.
Figure 6:
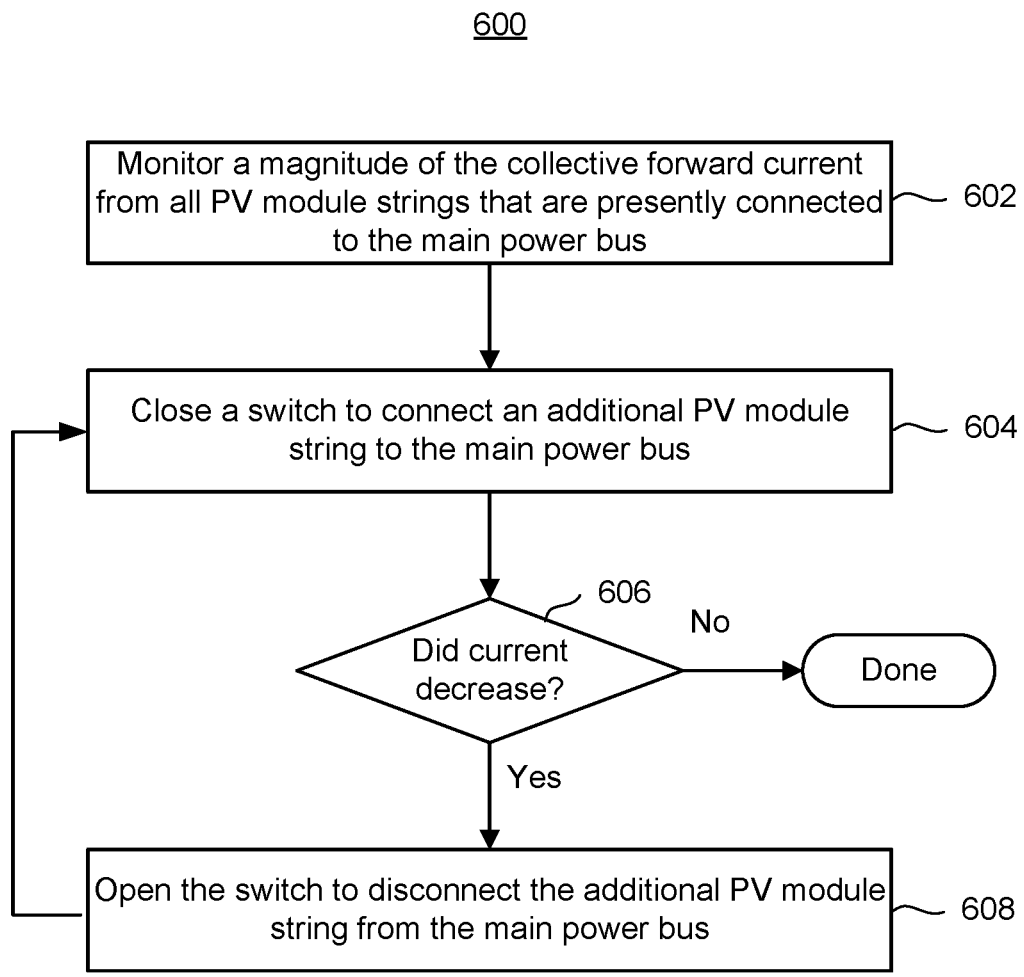
FIG. 6 is a flowchart of one embodiment of a process of detecting reverse current in a PV module string using the bus current monitor.
Figure 7:
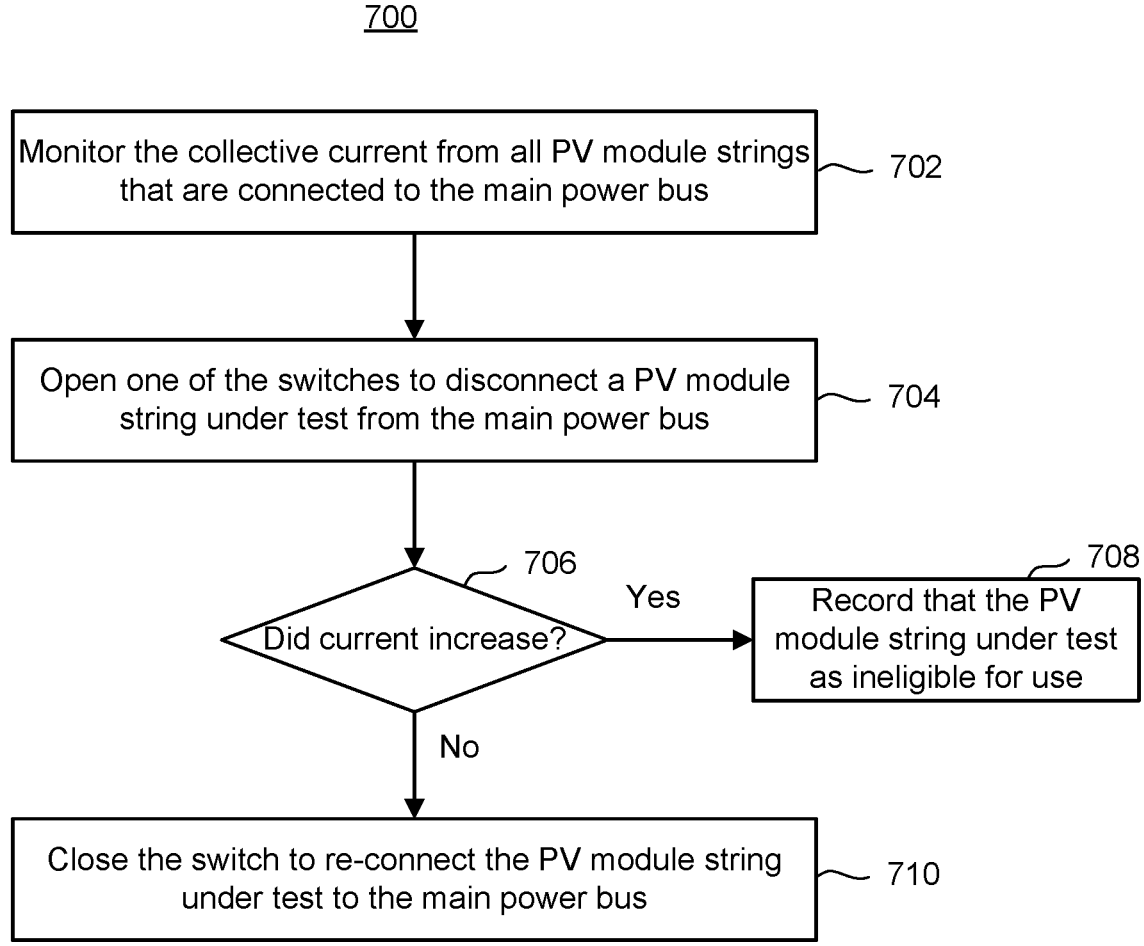
FIG. 7 is a flowchart of one embodiment of a process of detecting reverse current in a PV module string using the bus current monitor.

Step 404 includes the control circuit 208 determining whether a reverse current flows in the direction from the main power bus to any respective PV module string 204 in the solar array when the respective PV module string is connected to the main power bus. FIGS. 5-7 describe several embodiments for detecting a reverse current flow in a PV module string 204; however, step 404 is not limited to those techniques. If no reverse current flows in any of the PV module strings 204 (step 406 is no), then no action is needed.

If a reverse current flows in a particular PV module string 204 (step 406 is yes), then in step 408 the control circuit 208 maintains the switch associated with the particular PV module string 204 in an open state to prevent reverse current from flowing in the particular PV module string 204. The control circuit 208 may record that this particular PV module string 204 is ineligible for use, at least until it is determined that a reverse current does not flow in the particular PV module string 204 if connected to the main power bus. In an embodiment, the control circuit 208 maintains a pool (list) of PV module strings 204 that are ineligible for use due to detection of a reverse current. In one embodiment, the status of a PV module string 204 may change to again become eligible for use. In one embodiment, the control circuit 208 re-tests PV module strings 204 on the ineligible list to determine whether a reverse current still flows in the respective PV module strings 204. Hence, it will be understood that maintaining the switch in the open state in step 408 to prevent reverse current flow does not mean that the switch is permanently kept open. In other words, if conditions change such that a reverse current does not flow in the PV module string 204, then the PV module string 204 is again eligible for use.

As discussed in connection with FIG. 2, there are different options for where to monitor current in order to determine whether there is a reverse current in a particular PV module string 204 when connected to the main power bus. FIG. 2 shows PV module string current monitors 226-1 226-2, . . . 226-n. FIG. 5 is a flowchart of one embodiment of a process 500 of detecting reverse current in a PV module string using PV module string current monitors 226-1, 226-2, . . . 226-n. Step 502 include separately monitoring, for each respective PV module string 204 presently connected to the main power bus, a direction of current flow between the main power bus and the respective PV module string 204. There are a number of ways to implement this monitoring. In one embodiment, whenever a PV module string current monitor 226 detects a reverse current (i.e., a current flowing from the main power bus 214a to the PV module string 204) the PV module string current monitor 226 will alert the control circuit 208. This alert may be achieved by changing the signal on the control line 252 from low to high (or high to low). In one embodiment, the control circuit 208 polls the PV module string current monitors 226 for the direction of the current. In one embodiment, the PV module string current monitors 226-1, 226-2, . . . 226-n continuously report the direction and/or signed magnitude of the current. The "signed magnitude" refers to reporting both the direction and the magnitude. In one embodiment, the RV module string current monitors 226-1, 226-2, . . . 226-n report the current information at regular intervals (e.g., every millisecond).

Step 504 is a determination by the control circuit 208 whether there are any reverse currents. If not, no action is needed. If there is a reverse current in a particular PV module strings 204 then in step 506 the control circuit 208 opens a switch to disconnect the particular PV module string 204 from the main power bus. Thus, the control circuit 208 prevents the reverse current in the particular PV module string 204.

In one embodiment, the control circuit 208 is able to independently control each switch and therefore in step 506 only opens the switch associated with the particular PV module string 204 that had the reverse current flow. However, the control circuit 208 could open additional switches in step 506 to disconnect other PV module strings 204 from the main bus. In one embodiment, to reduce the complexity of circuitry, a group of several switches are operated in unison (e.g., all open or all closed). Thus, in one embodiment of step 506 the control circuit 208 will open a group a switches to prevent the reverse current flow to the particular PV module string 204.

In one embodiment, data from the bus current monitor 210 is used to detect a reverse current in a PV module string 204. FIG. 6 is a flowchart of one embodiment of a process 600 of detecting reverse current in a PV module string using data from the bus current monitor 210. In one embodiment, this process 600 is performed when an additional PV module string 204 is connected to the main power bus as a normal part of power regulation. Step 602 includes monitoring a magnitude of collective forward current flow from all of the PV module strings 204 that are presently connected to the main power bus.

Step 604 includes the control circuit 208 closing a switch to connect an additional PV module string 204 to the main power bus. This additional PV module string 204 will be referred to as a PV module string under test. As noted, closing of the switch could be performed as the normal procedure of transferring power from the solar array 104 to the main power bus. That is, closing of the switch could be performed as the normal procedure of power regulation. For example, the switch may be closed in response to determining that one more PV module string 204 should be connected to the main power bus to provide power, current, and/or voltage to the main power bus. As noted above, in some embodiments each switch can be operated independent of the other switches. In an embodiment of step 604, only one switch is closed in step 604 such that only one additional PV module string is connected to the main power bus.

Step 606 includes a determination of whether the current on the main power bus decreased in response to closing the switch. If the current on the main power bus decreased, this may indicate that a reverse current flows in the PV module string under test. If the current on the main power bus does not decrease then the process concludes. If the current on the main power bus does decrease then in step 608 the control circuit 208 opens the switch to disconnect the PV module string under bus form the main power bus. Thus, the control circuit 208 prevents the reverse current in the PV module string under test. The process then returns to step 604 to close another switch under the assumption that another PV module string 204 should be connected to the main power bus to meet power, voltage, and/or current requirements.

An alternative to the process in FIG. 6 is to open a switch and determine whether a current on the main bus decreases in order to determine whether there was a reverse current in a PV module string under test. FIG. 7 is a flowchart of one embodiment of a process 700 of detecting reverse current in a PV module string using the bus current monitor 210. Process 700 may be used to test PV module strings that are already connected to the main power bus. For example, when first connected to the main power bus the PV module strings can be tested as in process 600. Over time, the conditions on a PV module string 204 could change such that a reverse current could begin to flow. Process 700 is one embodiment for testing for such a condition.

Step 702 includes monitoring a magnitude of collective forward current flow from all of the PV module strings 204 that are presently connected to the main power bus.

Step 704 includes the control circuit 208 opening a switch to disconnect to a PV module string under test from the main power bus. Opening of the switch could be performed as a special testing procedure that is performed by the control circuit 208 from time to time. As noted above, in some embodiments each switch can be operated independent of the other switches. In an embodiment of step 704, only one switch is opened in step 704 such that only one additional PV module string is disconnected from the main power bus.

Step 706 includes a determination of whether the current on the main power bus increased in response to opening the switch. If the current on the main power bus increased this may indicate that a reverse current was flowing in the PV module string under test. In that case, then the switch is left open such that reverse current flow is prevented in the PV module string under test. Also, in step 708 the control circuit 208 may record that the reverse current was flowing in the PV module string under test such that this PV module string is ineligible for use at least until it is verified that a reverse current does not flow in the PV module string when connected to the main power bus. Additionally, the control circuit 208 may connect a different PV module string 204 to the main power bus to replace the PV module string that had the reverse current flow. Process 600 may be performed when connecting this new PV module string 204 to verify that a reverse current does not flow in this newly added PV module string 204.

If the current on the main power bus does not increase (step 706 is no) then the switch is closed in step 710 to re-connect the PV module string under test to the main power bus. Step 710 is performed under the assumption that the PV module string under test should be reconnected to the main power bus to meet the present power, voltage, and/or current requirements.

A variation of the process 700 of FIG. 7 may be performed when disconnecting a module string 204 as a part of normal power regulation. That is, as a part of normal power regulation the control circuit 208 may determine that one of the PV module strings 204 should be disconnected from the main power bus. In this scenario it is possible that this PV module string 204 had a reverse current flow prior to disconnection. The control circuit 208 can detect this reverse current flow based on performance of steps 702-706. Upon detection of the reverse current flow, the control circuit 208 can mark this PV module string 204 as ineligible for use, at least until the control circuit 208 verifies that a reverse current does not flow when the PV module string 204 is connected to the main power bus. Clearly step 710 is not performed in the event that the current does not increase (step 706 is no) because the intent was to disconnect the PV module string 204 in accordance with the power regulation.

In process 600 and 700 the collective current from all PV module strings 204 connected to the main power bus is monitored (see steps 602, 702). An alternative is to monitor the collective current from a group of PV module strings 204 connected to the main power bus, wherein the group does not contain all of the PV module strings 204 connected to the main power bus. For such an embodiment, the current monitor in the PCDU 206 can be at a different location than those depicted in FIG. 2. For example, if a group of the electrical lines 211 join together such that these lines 211 have a single connection to the main power bus, the current of this group of the electrical lines 211 can be monitored.

As has been discussed above, the control circuit 208 may maintain a switch in an open state to prevent a reverse current from flowing in a PV module string 204. In an embodiment, the control circuit 208 maintains a pool (list) of PV module strings 204 that are ineligible for use. In one embodiment, the status of a PV module string 204 may change to again become eligible for use. In one embodiment, the control circuit 208 re-tests PV module strings 204 on the ineligible list to determine whether a reverse current still flows in the respective PV module strings 204. In one embodiment, this re-test includes performing process 600.

Figure 8:
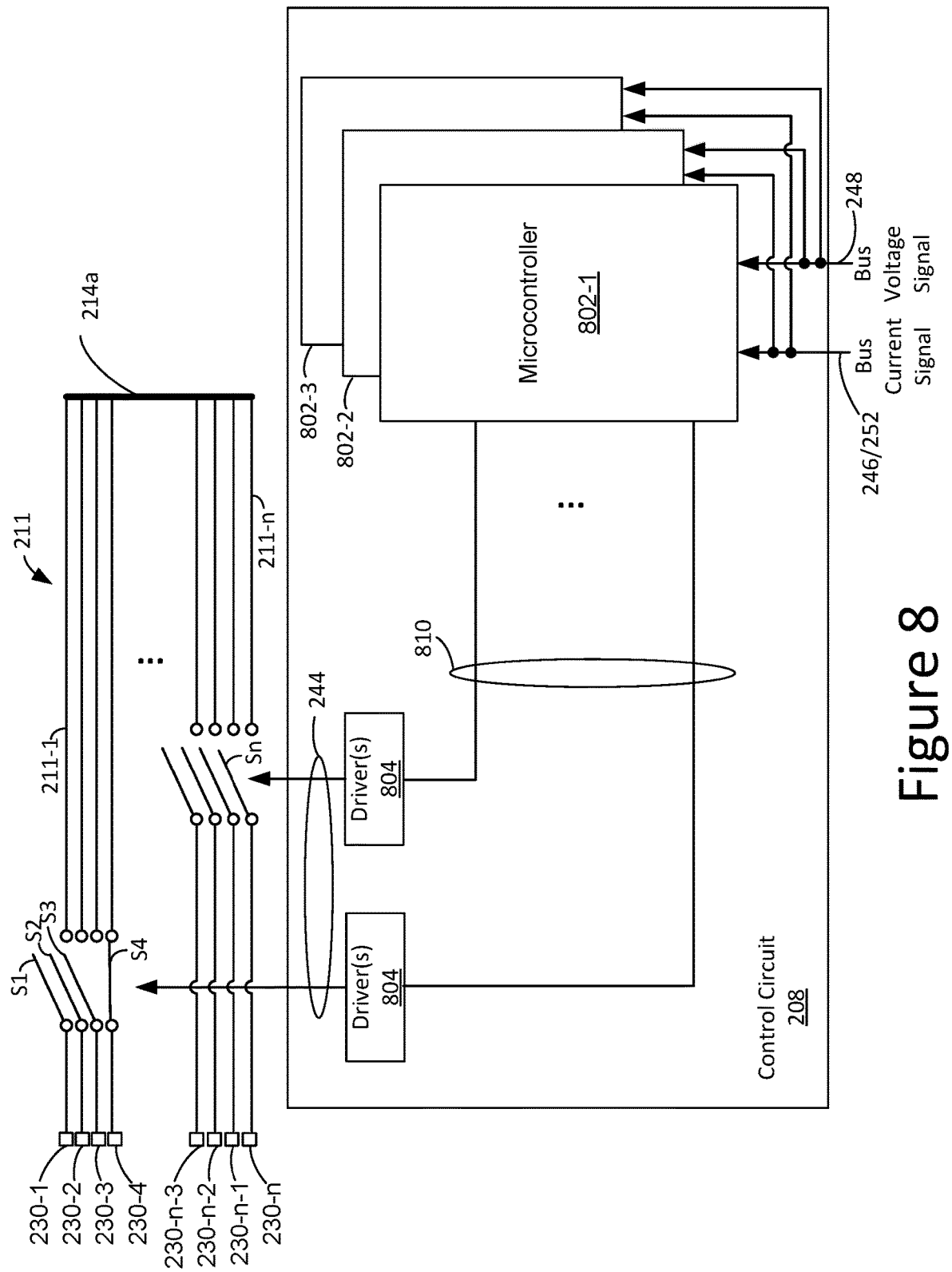
FIG. 8 is a diagram of an embodiment in which the control circuit in the PCDU contains a microcontroller.

In one embodiment, the control circuit 208 contains a microcontroller. FIG. 8 is a diagram of an embodiment in which the control circuit 208 in the PCDU 206 contains a microcontroller 802. In an embodiment, there are multiple microcontrollers to provide redundancy. In the example of FIG. 8, there are three microcontrollers 802-1, 802-2, 802-3, which operate on the principle of majority vote. Thus, all three microcontrollers 802-1, 802-2, 802-3 perform the same computations. Each microcontroller 802 receives a bus current signal over control line(s) 246/252 and bus voltage signal over control line 248. Each microcontroller 802-1, 802-2, 802-3 determines how the switches S1-Sn should be operated. Based on a majority vote one set of control signals are sent over control lines 810 to the drivers 804. The drivers send control signals over control lines 244 to control the switches S1-Sn.

FIG. 8 shows some of the switches, each of which is connected to the positive line 214a of the main power bus by way of an electrical line 211. For example, switch Si is connected to positive line 214a of the main power bus by electrical line 211-1, Sn is connected to positive line 214a by electrical line 211-n, etc. Each switch is also connected to a PV module string input 230. For example, switch S1 is connected to PV module string input 230-1, S2 is connected to PV module string input 230-2, etc. Thus, each switch is able to connect or disconnect the PV module string 204 to/from the positive line 214a of the main power bus. In an embodiment, the switches are individually controllable. Switch S4 is depicted in the closed state. The rest of the switches are depicted in the open state. In an embodiment, any number and combination of the switches may be in the closed state. In one embodiment, a group of the switches are operated together to simplify the circuitry. For example, if a reverse current is detected in a particular PV module string 204, all switches in a group of switches may be opened in order to prevent the reverse current in the particular PV module string 204. In one embodiment, the PV module string current monitors 220 are used to detect a reverse current in a particular PV module string when a group of switches are closed together.

In one embodiment, microcontroller 802 is programmable by software. In other embodiments, the programmable and reprogrammable microcontroller 802 does not use software and is completely implemented in hardware (e.g., electrical circuits). The microcontroller 802 may comprise one or more processors that process and/or execute microcode or other computer executable code (e.g., an instruction set) to perform tasks or operations. In an embodiment, the microcontroller 802 executes instructions on a processor (e.g., microprocessor). These processor executable instructions may be stored in non-transitory storage. The non-transitory storage could be volatile memory or non-volatile memory. Examples of volatile memory include, but are not limited to, DRAM and SRAM. Example of non-volatile memory include, but are not limited to, EEPROM and Flash (e.g., NAND, NOR). The non-transitory storage may reside within the PCDU 206 or be external to the PCDU 206. In an embodiment, the microcontroller 802 is able to perform additional tasks for functions of the PCDU 206 such as command processing and telemetry.

Figure 9:
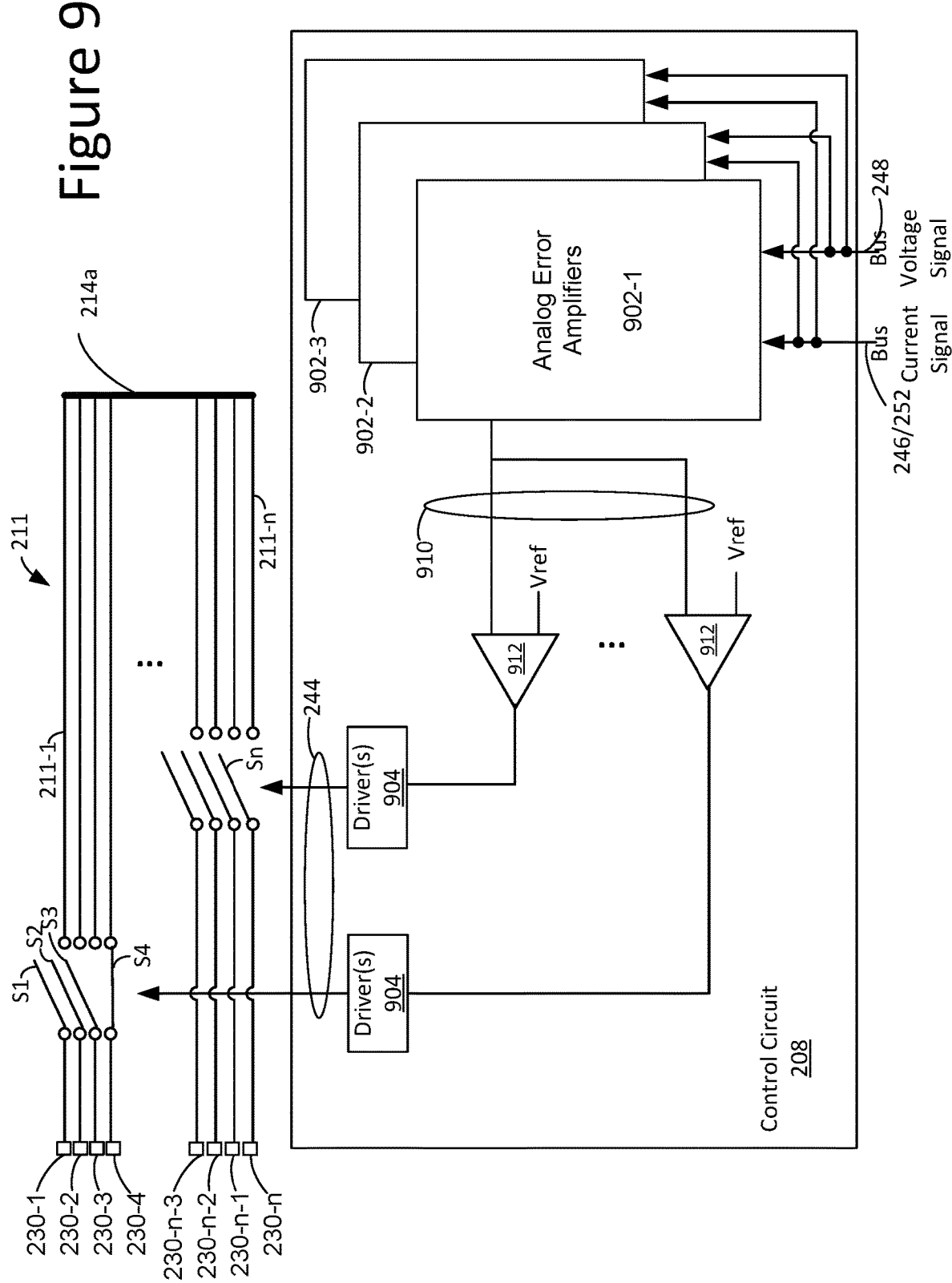
FIG. 9 is a diagram of an embodiment in which the control circuit in the PCDU contains analog error amplifiers.

In one embodiment, the control circuit 208 in the PCDU 206 contains analog error amplifiers. FIG. 9 is a diagram of an embodiment in which the control circuit 208 in the PCDU 206 contains analog error amplifiers 902. In an embodiment, there are multiple sets of analog error amplifiers to provide redundancy. In the example of FIG. 9, there are three sets of analog error amplifiers 902-1, 902-2, 902-3, which operate on the principle of majority vote. Thus, all three sets of analog error amplifiers 902-1, 902-2, 902-3 perform the same functions. Each set of analog error amplifiers 902 receives a bus current signal over control line(s) 246/252 and bus voltage signal over control line 248. Each set of analog error amplifiers 902-1, 902-2, 902-3 determines how the switches S1-Sn should be operated. Based on a majority vote one set of control signals are sent over control lines 910 to the operational amplifiers 912. In an embodiment, each set of analog error amplifiers 902-1, 902-2, 902-3 contains several error amplifiers. In an embodiment, there is a current error amplifier, which receives the current signal and generates an output that indicates whether the number of switches that are closed should be increased or decreased to meet a target current. In an embodiment, there is a voltage error amplifier, which receives the voltage signal and generates an output that indicates whether the number of switches that are closed should be increased or decreased to meet a target voltage. In an embodiment, there is an overvoltage error amplifier. The overvoltage refers to an overvoltage condition of a battery that is charged by the PCDU 206. The purpose of the overvoltage error amplifier is to generate a signal to shut down the charging current to the battery in the event that the battery voltage is too high (i.e., overvoltage). Thus, the overvoltage error amplifier inputs the battery voltage and generates an output signal that indicates one or more switches should be opened to reduce the charging current to the battery to zero Amperes.

Based on a majority vote, the analog error amplifiers 902 send control signals to the individual switch error amplifiers 912. Each individual switch error amplifier 912 sends a control signal to switch driver(s) 904. Each switch driver(s) 904 contains one or more drivers for driving a switch. In one embodiment, there is a switch driver dedicated to switch S1-Sn. Thus, in one embodiment, there are n switch drivers 904.

Figure 10:
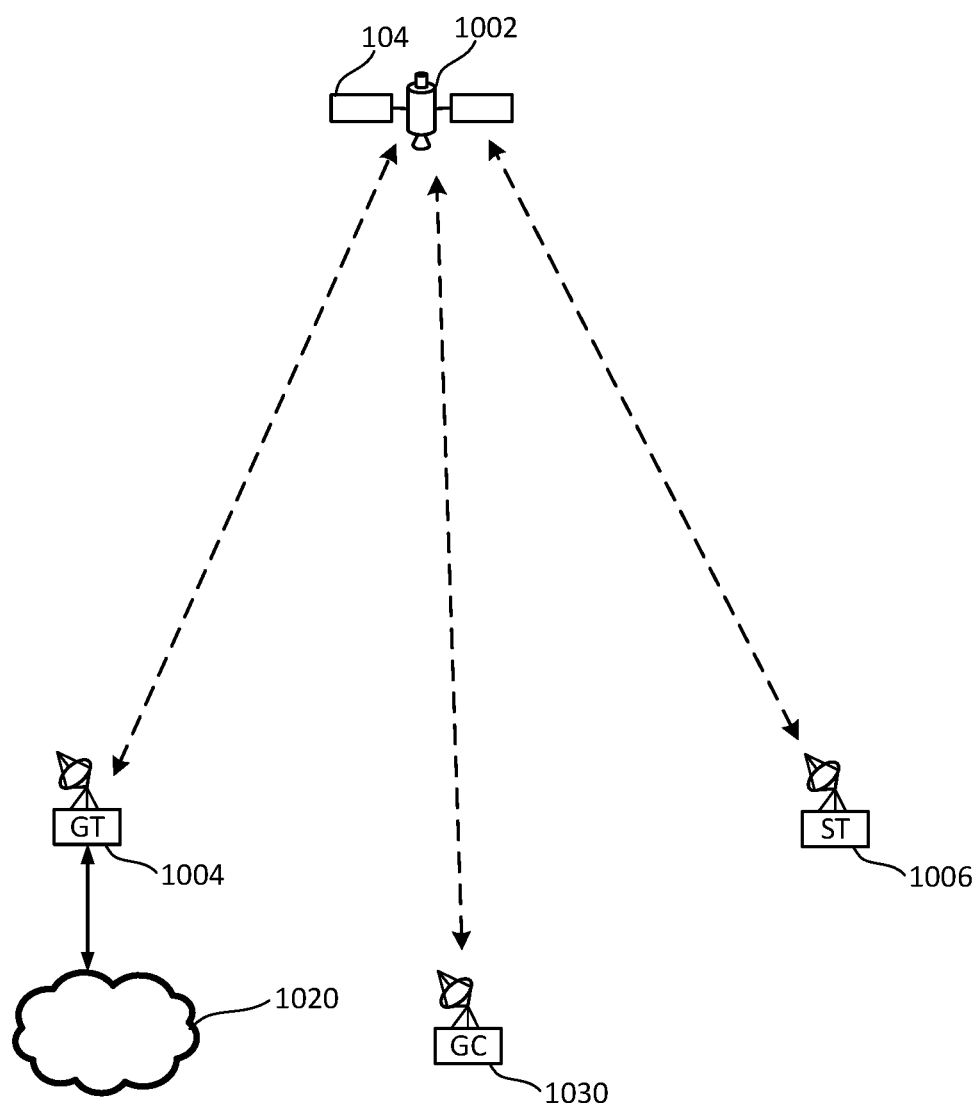
FIG. 10 is a block diagram of a spacecraft system.

In some embodiments, the solar array 104 and PCDU 206 are deployed terrestrially. In some embodiments, the solar array 104 and PCDU 206 are deployed in space. In one embodiment, the solar array 104 and PCDU 206 are used in a spacecraft. FIG. 10 is a block diagram of a spacecraft system. The system of FIG. 10 includes spacecraft 1002, subscriber terminal 1006, gateway 1004, and ground control terminal 1030. Subscriber terminal 1006, gateway 1004, and ground control terminal 1030 are examples of ground terminals. In one embodiment, spacecraft 1002 is a satellite; however, spacecraft 1002 can be other types of spacecrafts. Spacecraft 1002 may be in a mission orbit, such as a geostationary or non-geostationary orbital location. Spacecraft 1002 has solar arrays 104 that generate electrical power, which may be used to power sub-systems and/or payloads of the spacecraft 1002. The spacecraft 1002 has one or more batteries, which may be used to power the sub-systems and/or payloads when the solar arrays 104 are not generating sufficient power. In some embodiments, the spacecraft 1002 has a PCDU 206 that prevents reverse current in PV module strings 204 in the solar array 104 of the spacecraft 1002.

Spacecraft 1002 is communicatively coupled by at least one wireless feeder link to at least one gateway terminal 1004 and by at least one wireless user link to a plurality of subscriber terminals (e.g., subscriber terminal 1006) via an antenna system. Gateway terminal 1004 is connected to the Internet 1020. The system allows spacecraft 1002 to provide internet connectivity to a plurality of subscriber terminals (e.g., subscriber terminal 1006) via gateway 1004. Ground control terminal 1030 is used to monitor and control operations of spacecraft 1002.

Figure 11:
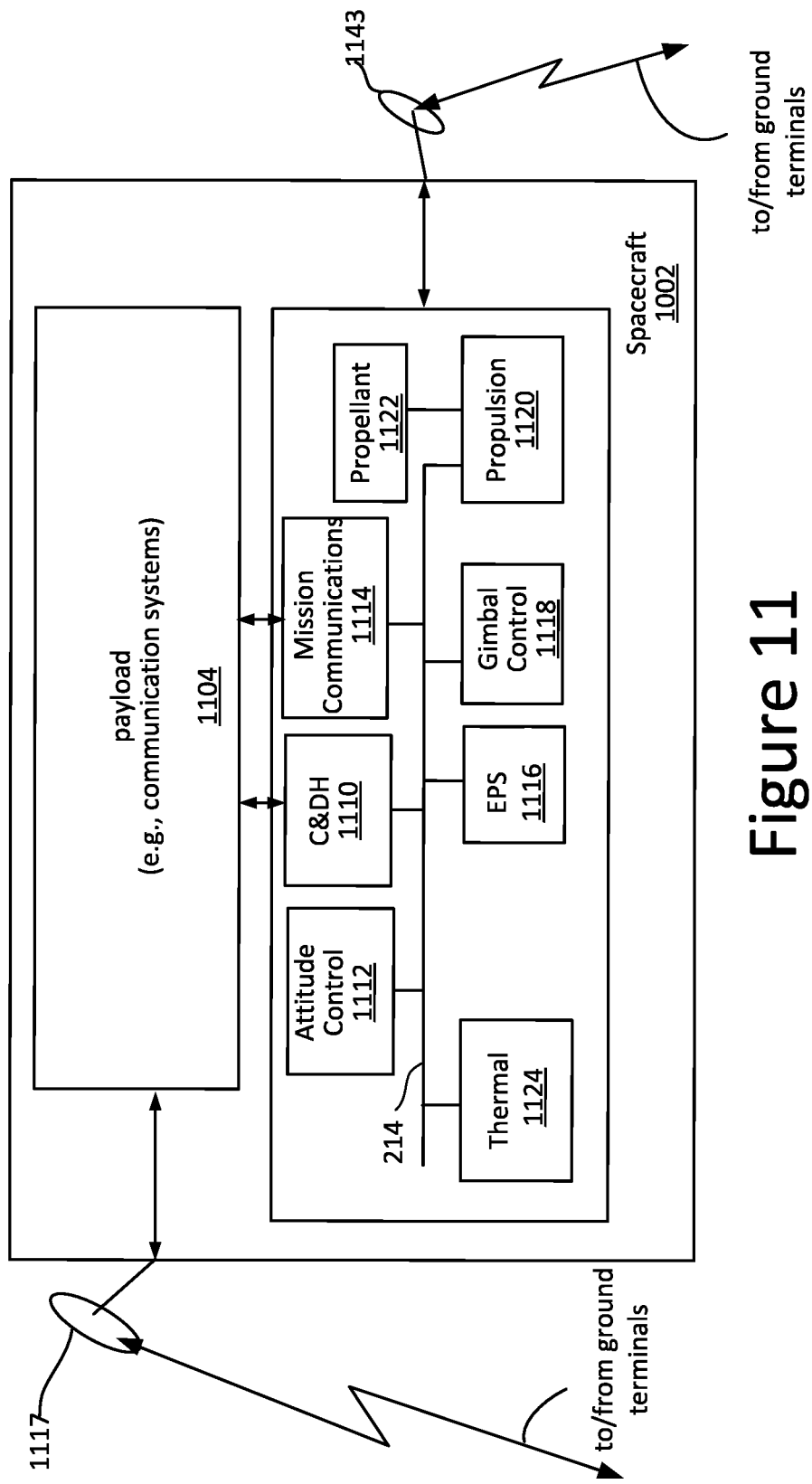
FIG. 11 is a block diagram of an example spacecraft.

FIG. 11 is block diagram of one embodiment of spacecraft 1002, which in one example (as discussed above) is a satellite. In one embodiment, spacecraft 1002 has a payload 1104, various sub-systems, and an EPS 1116. Some embodiments of spacecraft 1002 may include more than one payload. The payload provides the functionality of communication, sensors and/or processing systems needed for the mission of spacecraft 1002.

EPS (Electrical Power Subsystems) 1116 can include one or more solar panels and charge storage (e.g., one or more batteries) used to provide power to spacecraft 1002. Power subsystems 1116 also includes a PCDU 206. The PCDU 206 of the EPS 1116 provide power to the main power bus 214. The main power bus 214 is connected to various subsystems, which are part of the load 218. The main power bus 214 may also provide power to the payload 1104, which may also be part of the load 218.

Each of the functional subsystems typically include electrical systems, as well as mechanical components (e.g., servos, actuators) controlled by the electrical systems. These include a command and data handling subsystem (C&DH) 1110, attitude control systems 1112, mission communication systems 1114, gimbal control electronics 1118 that be taken to include a solar array drive assembly, a propulsion subsystem 1120 (e.g., thrusters), propellant storage 1122 to fuel some embodiments of propulsion subsystem 1120, and thermal control subsystem 1124, all of which are connected by an internal communication network, which can be an electrical bus (a "flight harness") or other means for electronic, optical or RF communication when spacecraft is in operation.

Also represented are an antenna 1143, that is one of one or more antennae used by the mission communication systems 1114 for exchanging communications for operating of the spacecraft with ground terminals, and a payload antenna 1117, that is one of one or more antennae used by the payload 1104 for exchanging communications with ground terminals, such as the antennae used by a communication satellite embodiment. Other equipment can also be included.

The command and data handling module 1110 includes any processing unit or units for handling includes command control functions for spacecraft 1002, such as for attitude control functionality and orbit control functionality. The attitude control systems 1112 can include devices including torque rods, wheel drive electronics, and control momentum gyro control electronics, for example, that are used to monitor and control the attitude of the spacecraft. Mission communication systems 1114 includes wireless communication and processing equipment for receiving telemetry data/commands, other commands from the ground control terminal 1030 to the spacecraft and ranging to operate the spacecraft. Processing capability within the command and data handling module 1110 is used to control and operate spacecraft 1002. An operator on the ground can control spacecraft 1002 by sending commands via ground control terminal 1030 to mission communication systems 1114 to be executed by processors within command and data handling module 1110. In one embodiment, command and data handling module 1110 and mission communication system 1114 are in communication with payload 1104.

Propulsion subsystem 1120 (e.g., thrusters) is used for changing the position or orientation of spacecraft 1002 while in space to move into orbit, to change orbit or to move to a different location in space. The gimbal control electronics 1118 can be used to move and align the antennae, solar panels, and other external extensions of the spacecraft 1002.

In one embodiment, the payload 1104 is for a communication satellite and includes an antenna system (represented by the antenna 1117) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 1114 acts as an interface that uses the antennae of payload 1104 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

A first embodiment includes an apparatus comprising a plurality of photovoltaic (PV) module strings, a plurality of switches, and one or more control circuits in communication with the plurality of switches. Each switch is connected between a respective PV module string and a power bus. Each switch has a closed state to electrically connect the respective PV module string to the power bus to provide a forward current from the respective PV module string to the power bus and an open state to create an open circuit between the respective PV module string and the power bus. The one or more control circuits are configured to operate the plurality of switches to connect a first set of the PV module strings to the power bus and disconnect a second set of the PV module strings from the power bus. The one or more control circuits are configured to determine whether a reverse current flows in any of the plurality PV module strings. The one or more control circuits are configured to maintain the switch associated with a particular PV module string in the open state to prevent reverse current from flowing in the particular PV module string responsive to a determination that a reverse current flows in the particular PV module string when the particular PV module string is connected to the power bus.

In a second embodiment in furtherance of the first embodiment, the one or more control circuits comprise a programmable and reprogrammable microcontroller configured to maintain the switch associated with the particular PV module string in the open state to prevent the reverse current from flowing in the particular PV module string.

In a third embodiment in furtherance of the first embodiment, the one or more control circuits comprise one or more analog error amplifiers configured to issue a control signal to maintain the switch associated with the particular PV module string in the open state to prevent the reverse current from flowing in the particular PV module string.

In a fourth embodiment, in furtherance of any of the first to third embodiments, each of the plurality of switches comprises a two-quadrant transistor based switch configured to directly connect the respective PV module string to the power bus when the two-quadrant transistor based switch is in an on state, wherein the on state of the two-quadrant transistor based switch corresponds to the closed state of the switch of the first embodiment. The two-quadrant transistor based switch is configured to prevent any current flow between the power bus and the respective PV module string when the transistor is in an off state, wherein the off state of the two-quadrant transistor based switch corresponds to the open state of the switch of the first embodiment.

In a fifth embodiment, in furtherance of any of the first to third embodiments, each of the plurality of switches comprises a relay configured to directly connect the respective PV module string to the power bus when the relay is closed. The relay is configured to prevent any current flow between the power bus and the respective PV module string when the relay is open.

In a sixth embodiment, in furtherance of any of the first to fifth embodiments, the one or more control circuits are configured to separately monitor, for each respective PV module string presently connected to the power bus, a direction of current flow between the power bus and the respective PV module string. The one or more control circuits are configured to determine, based on the monitoring, whether a reverse current flows in any respective PV module string when the respective PV module string is connected to the power bus.

In a seventh embodiment, in furtherance of any of the first to sixth embodiments, the one or more control circuits are configured to monitor a magnitude of collective forward current flow from a group of the PV module strings that are presently connected to the power bus, the group including a PV module string under test. The one or more control circuits are configured to open the switch connected to the PV module string under test to disconnect the PV module string under test from the power bus. The one or more control circuits are configured to determine whether the collective forward current from the PV module strings in the group that remain connected to the power bus increases in response to opening the switch. The one or more control circuits are configured to determine, in response to the increase in the collective forward current, that a reverse current flows in the PV module string under test when the PV module string under test is connected to the power bus.

In an eighth embodiment, in furtherance of any of the first to seventh embodiments, the one or more control circuits are configured to monitor a magnitude of collective forward current flow from a group of the PV module strings that are presently connected to the power bus, the group not including a PV module string under test. The one or more control circuits are configured to close the switch connected to the PV module string under test to connect the PV module string under test to the power bus. The one or more control circuits are configured to determine whether the collective forward current from the PV module strings in the group and the PV module string under test decreases in response to closing the switch. The one or more control circuits are configured to determine, in response to the decrease in the collective forward current, that a reverse current flows in the PV module string under test when the PV module string under test is connected to the power bus.

In a ninth embodiment, in furtherance of any of the first to eighth embodiments, the plurality of switches and the one or more control circuits reside in a power control and distribution unit (PCDU) of a spacecraft.

In a tenth embodiment, in furtherance of any of the first to ninth embodiments, each PV module string comprises a plurality of PV modules connected in series, and each PV module comprises at least one string of PV cells connected in series.

One embodiment includes a method for preventing reverse current in a solar array. The method comprises operating a plurality of switches to connect a first set of photovoltaic (PV) module strings in the solar array to a power bus and disconnect a second set of PV module strings in the solar array from the in power bus. Each PV module string comprises a plurality of PV modules connected in series. The method comprises determining whether a reverse current flows in a direction from the power bus to any respective PV module string in the solar array when the respective PV module string is connected to the power bus. The method comprises maintaining the switch associated with a particular PV module string in an open state to prevent reverse current from flowing to the particular PV module string responsive to a determination that a reverse current flows to the particular PV module string when the particular PV module string is connected to the power bus.

One embodiment includes a spacecraft comprising a main power bus, a plurality of photovoltaic (PV) module strings, and a power control and distribution unit (PCDU) connected to the plurality of PV module strings and the main power bus. Each PV module string comprises a set of series connected PV modules. Each PV module comprising at least one PV cell. The PDCU comprises a plurality of two-quadrant transistor based switches and a control circuit in communication with the plurality of two-quadrant transistor based switches. Each two-quadrant transistor based switch is connected between a respective PV module string and the main power bus. Each two-quadrant transistor based switch has an on state to electrically connect the respective PV module string to the main power bus to provide a forward current from the respective PV module string to the main power bus and an off state to create an open circuit between the respective PV string and the main power bus. The forward current provides power to the main power bus. The control circuit turns on a first set of the two-quadrant transistor based switches to connect a first set of the PV module strings to the main power bus to directly transfer power from the first set of the photovoltaic PV module strings to the main power bus while keeping off a second set of the two-quadrant transistor based switches to prevent current flow between a second set of the PV module strings and the main power bus. The control circuit determines whether a reverse current flows in the direction from the main power bus to any of the PV module strings connected to the main power bus. The control circuit turns off the two-quadrant transistor based switch associated with a particular PV module string to prevent reverse current from flowing from the main power bus to the particular PV module string responsive to a determination that a reverse current flows to the particular PV module string when the particular PV module string is connected to the main power bus.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. An apparatus comprising:
   a plurality of photovoltaic (PV) module strings;
   a plurality of switches, each switch connected between a respective PV module string and a power bus, wherein each switch has a closed state to electrically connect the respective PV module string to the power bus to provide a forward current from the respective PV module string to the power bus and an open state to create an open circuit between the respective PV module string and the power bus; and
   one or more control circuits in communication with the plurality of switches, wherein the one or more control circuits are configured to:
      operate the plurality of switches to connect a first set of the PV module strings to the power bus and disconnect a second set of the PV module strings from the power bus;
      determine whether a reverse current flows in any of the plurality of PV module strings; and
      maintain the switch associated with a particular PV module string in the open state to prevent reverse current from flowing in the particular PV module string responsive to a determination that a reverse current flows in the particular PV module string when the particular PV module string is connected to the power bus.

2. The apparatus of claim 1, wherein the one or more control circuits comprise a programmable and reprogrammable microcontroller configured to maintain the switch associated with the particular PV module string in the open state to prevent the reverse current from flowing in the particular PV module string.

3. The apparatus of claim 1, wherein the one or more control circuits comprise one or more analog error amplifiers configured to issue a control signal to maintain the switch associated with the particular PV module string in the open state to prevent the reverse current from flowing in the particular PV module string.

4. The apparatus of claim 1, wherein each of the plurality of switches comprises a two-quadrant transistor based switch configured to:
   directly connect the respective PV module string to the power bus when the two-quadrant transistor based switch is in an on state, wherein the on state of the two-quadrant transistor based switch corresponds to the closed state of the switch of claim 1; and
   prevent any current flow between the power bus and the respective PV module string when the two-quadrant transistor based switch is in an off state, wherein the off state of the two-quadrant transistor based switch corresponds to the open state of the switch of claim 1.

5. The apparatus of claim 1, wherein each of the plurality of switches comprises a relay configured to:
   directly connect the respective PV module string to the power bus when the relay is closed; and
   prevent any current flow between the power bus and the respective PV module string when the relay is open.

6. The apparatus of claim 1, wherein the one or more control circuits are configured to:
   separately monitor, for each respective PV module string presently connected to the power bus, a direction of current flow between the power bus and the respective PV module string; and
   determine, based on the monitoring, whether a reverse current flows in any respective PV module string when the respective PV module string is connected to the power bus.

7. The apparatus of claim 1, wherein the one or more control circuits are configured to:
   monitor a magnitude of collective forward current flow from a group of the PV module strings that are presently connected to the power bus, the group including a PV module string under test;
   open the switch connected to the PV module string under test to disconnect the PV module string under test from the power bus;
   determine whether the collective forward current from the PV module strings in the group that remain connected to the power bus increases in response to opening the switch; and
   determine, in response to the increase in the collective forward current, that a reverse current flows in the PV module string under test when the PV module string under test is connected to the power bus.

8. The apparatus of claim 1, wherein the one or more control circuits are configured to:
   monitor a magnitude of collective forward current flow from a group of the PV module strings that are presently connected to the power bus, the group not including a PV module string under test;
   close the switch connected to the PV module string under test to connect the PV module string under test to the power bus;
   determine whether the collective forward current from the PV module strings in the group and the PV module string under test decreases in response to closing the switch; and
   determine, in response to the decrease in the collective forward current, that a reverse current flows in the PV module string under test when the PV module string under test is connected to the power bus.

9. The apparatus of claim 1, wherein the plurality of switches and the one or more control circuits reside in a power control and distribution unit (PCDU) of a spacecraft.

10. The apparatus of claim 1, wherein PV module string comprises a plurality of PV modules connected in series, each PV module comprises at least one string of PV cells connected in series.

11. A method for preventing reverse current in a solar array, the method comprising:
   operating a plurality of switches to connect a first set of photovoltaic (PV) module strings in the solar array to a power bus and disconnect a second set of PV module strings in the solar array from the power bus, each PV module string comprising a plurality of PV modules connected in series;
   determining whether a reverse current flows in a direction from the power bus to any respective PV module string in the solar array when the respective PV module string is connected to the power bus; and
   maintaining the switch associated with a particular PV module string in an open state to prevent reverse current from flowing to the particular PV module string responsive to a determination that a reverse current flows to the particular PV module string when the particular PV module string is connected to the power bus.

12. The method of claim 11, wherein determining whether a reverse current flows in the direction from the power bus to any of the PV module strings when the PV module string is connected to the power bus comprises:
  monitoring, for each respective PV module string connected to the power bus, a direction of current flow in each respective PV module string; and
  determining whether a reverse current flows in the direction from the power bus to any of the PV module strings in the set based on the direction of current flow for each respective PV module string.

13. The method of claim 12, wherein maintaining the switch associated with a particular PV module string in an open state to prevent reverse current from flowing to the particular PV module string responsive to a determination that a reverse current flows to the particular PV module string when the particular PV module string is connected to the power bus comprises:
  switching off a two-quadrant transistor based switch associated with the particular PV module string to disconnect the particular PV module string from the power bus.

14. The method of claim 11, wherein determining whether a reverse current flows in the direction from the power bus to any of the PV module strings when the PV module string is connected to the power bus comprises:
  determining a magnitude of collective forward current flow from a group of the PV module strings that are presently connected to the power bus, the group including a PV module string under test;
  opening a switch connected to the PV module string under test to disconnect the PV module string under test from the power bus;
  determining whether the collective forward current from the PV module strings in the group that remain connected to the power bus increases in response to opening the switch; and
  determining, in response to the increase in the collective forward current, that a reverse current flows in the direction from the power bus to the PV module string under test when the PV module string under test is connected to the power bus.

15. The method of claim 11, wherein determining whether a reverse current flows in the direction from the power bus to any of the PV module strings when the PV module string is connected to the power bus comprises:
  monitoring a magnitude of collective forward current flow from a group of the PV module strings that are presently connected to the power bus, the group not including a PV module string under test;
  closing a switch to connect to the PV module string under test to the power bus;
  determining whether the collective forward current from the PV module strings in the group and the PV module string under test decreases in response to closing the switch; and
  determining, in response to the decrease in the collective forward current, that a reverse current flows in the direction from the power bus to the PV module string under test when the PV module string under test is connected to the power bus.

16. The method of claim 15, wherein determining whether a reverse current flows in the direction from the power bus to any of the PV module strings when the PV module string is connected to the power bus is performed by a programmable and reprogrammable microcontroller.

17. The method of claim 15, wherein each PV module comprises at least one string of PV cells connected in series.

18. A spacecraft comprising:
  a main power bus;
  a plurality of photovoltaic (PV) module strings, each PV module string comprising a set of series connected PV modules, each PV module comprising at least one PV cell; and
  a power control and distribution unit (PCDU) connected to the plurality of PV module strings and the main power bus, the PCDU comprising:
    a plurality of two-quadrant transistor based switches, each two-quadrant transistor based switch connected between a respective PV module string and the main power bus, wherein each two-quadrant transistor based switch has an on state to electrically connect the respective PV module string to the main power bus to provide a forward current from the respective PV module string to the main power bus and an off state to create an open circuit between the respective PV string and the main power bus, wherein the forward current provides power to the main power bus; and
    a control circuit in communication with the plurality of two-quadrant transistor based switches, wherein the control circuit:
      turns on a first set of the two-quadrant transistor based switches to connect a first set of the PV module strings to the main power bus to directly transfer power from the first set of the photovoltaic PV module strings to the main power bus while keeping off a second set of the two-quadrant transistor based switches to prevent current flow between a second set of the PV module strings and the main power bus;
      determines whether a reverse current flows in the direction from the main power bus to any of the PV module strings connected to the main power bus; and
      turns off the two-quadrant transistor based switch associated with a particular PV module string to prevent reverse current from flowing from the main power bus to the particular PV module string responsive to a determination that a reverse current flows to the particular PV module string when the particular PV module string is connected to the main power bus.

19. The spacecraft of claim 18, wherein the control circuit comprises a microprocessor configured to:
  mark the particular PV module string as ineligible for use in response to determining that a reverse current flows in the direction from the main power bus the particular PV module string;
  and keep the two-quadrant transistor based switch associated with the particular PV module string off to prevent the reverse current from flowing to the particular PV module string.

20. The spacecraft of claim 19, wherein the microprocessor is configured to:
  separately monitor, for each respective PV module string presently connected to the main power bus, a direction of current flow in the respective PV module string; and
  determine, based on the monitoring, whether a reverse current flows in the direction from the main power bus to any respective PV module string when the respective PV module string is connected to the main power bus.

21. The spacecraft of claim 19, wherein the microprocessor is configured to:
  monitor a magnitude of collective forward current flow from a group of the PV module strings that are presently connected to the main power bus, the group including a PV module string under test;

turn off a two-quadrant transistor based switch connected to the PV module string under test to disconnect the PV module string under test from the main power bus;

determine whether the collective forward current from the PV module strings in the group that remain connected to the main power bus increases in response to turning off the two-quadrant transistor based switch; and determine, in response to the increase in the collective forward current, that a reverse current flows in the direction from the main power bus to the PV module string under test when the PV module string under test is connected to the main power bus.

22. The spacecraft of claim 19, wherein the microprocessor is configured to:

monitor a magnitude of collective forward current flow from a group of the PV module strings that are presently connected to the main power bus, the group not including a PV module string under test;

turn on a two-quadrant transistor based switch to connect the PV module string under test to the main power bus;

determine whether the collective forward current from the PV module strings in the group and the PV module string under test decreases in response to turning on the two-quadrant transistor based switch; and determine, in response to the decrease in the collective forward current, that a reverse current flows in the direction from the main power bus to the PV module string under test when the PV module string under test is connected to the main power bus.

23. The spacecraft of claim 19, wherein each respective two-quadrant transistor based switch comprises two MOSFETs in series, wherein each MOSFET has an internal body diode, wherein the two MOSFET in series have their respective internal body diodes pointing in opposite directions.

* * * * *